United States Patent
Zhang et al.

(10) Patent No.: US 7,236,764 B2
(45) Date of Patent: Jun. 26, 2007

(54) METHOD AND APPARATUS FOR UPDATING LOCATIONS OF DORMANT MOBILE STATIONS

(75) Inventors: Hang Zhang, Nepean (CA); Mo-Han Fong, L'Orignal (CA); Ke-Chi Jang, Plano, TX (US); Jun Li, Richardson, TX (US); Xixian Chen, Nepean (CA); Chung-Ching Wang, Plano, TX (US); Geng Wu, Plano, TX (US); James Weisert, Calgary (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 667 days.

(21) Appl. No.: 10/751,952

(22) Filed: Jan. 7, 2004

(65) Prior Publication Data

US 2004/0179492 A1    Sep. 16, 2004

Related U.S. Application Data

(60) Provisional application No. 60/469,105, filed on May 9, 2003, provisional application No. 60/438,748, filed on Jan. 8, 2003.

(51) Int. Cl.
*H04Q 7/20* (2006.01)
(52) U.S. Cl. .................. 455/346; 455/456.1; 370/331
(58) Field of Classification Search ........ 455/346–349, 455/404.1, 456.1, 115.3, 134, 135, 161.3, 455/226.2; 370/331, 332
See application file for complete search history.

(56) References Cited

U.S. PATENT DOCUMENTS

| | | | |
|---|---|---|---|
| 5,889,770 | A | 3/1999 | Jokiaho et al. |
| 6,058,308 | A | 5/2000 | Kallin et al. |
| 6,138,018 | A | 10/2000 | Pashtan et al. |

(Continued)

FOREIGN PATENT DOCUMENTS

EP    1304835    4/2003

(Continued)

OTHER PUBLICATIONS

"3GPP2 Access Network Interfaces Interoperability Specification Release "A" 3GPP2 A.S0001", Jan. 2000, XP002201614.

(Continued)

*Primary Examiner*—Congvan Tran
(74) *Attorney, Agent, or Firm*—Borden Ladner Gervais LLP

(57) ABSTRACT

In code division multiple access communication systems, there are three levels for updating locations of dormant mobile stations (MSs) and setting up fast call. In sector and are levels, the dormant MS send a layer 2 message containing a message type and MS identifier to a base transceiver station (BTS). Since the message is associated with the sector where the MS is located, the network is aware of the MS's location from the updated location. The dormant MS sends to the BTS a reconnect message containing a message type and an MS identifier. The MS's dormant to active state transition is initiated by the MS. In the communication network, sub-packet zone ID is broadcasted in the overhead message. The MS reports its location change on R-CSCH and the network with the BSC level control can page the MS within the zone where the MS sends the report.

32 Claims, 7 Drawing Sheets

U.S. PATENT DOCUMENTS

| | | | |
|---|---|---|---|
| 6,243,579 B1* | 6/2001 | Kari | 455/426.1 |
| 6,950,415 B2* | 9/2005 | Chang et al. | 370/331 |
| 6,954,647 B2* | 10/2005 | Lin et al. | 455/455 |
| 7,079,511 B2* | 7/2006 | Abrol et al. | 370/331 |
| 7,136,665 B2* | 11/2006 | Ida et al. | 455/522 |
| 7,148,844 B2* | 12/2006 | Salkhi | 342/357.12 |
| 2002/0052204 A1 | 5/2002 | Bender et al. | |
| 2002/0075823 A1 | 6/2002 | Lee et al. | |
| 2002/0187793 A1 | 12/2002 | Papadimitriou et al. | |
| 2003/0002464 A1 | 1/2003 | Rezaiifar et al. | |

FOREIGN PATENT DOCUMENTS

| | | |
|---|---|---|
| WO | WO00/28747 | 5/2000 |
| WO | WO01/52589 | 7/2001 |

OTHER PUBLICATIONS

Kruijt et al., "Location management strategies for cellular mobile networks", *Electronics and Communication Engineering Journal, Institution of Electrical Engineers*, vol. 10, No. 2, Apr. 1998, pp. 64-72, XP000782774.

"Upper Layer (Layer 3) Signaling Standard for CDMA2000 Spread Spectrum Systems", *Telecommunications Industry Association: TIA/EIA/IS—2000. 5-C, Release C, p. xv*, Chapters: 2.6.5; 2.7.2.3.2.5; 2.7.2.3.2.6'; 2.7.2.3.2.21; 2.7.2.3.2.27; 2.7.2.3.2.34; 3.7.2.3.2.1; 3.7.2.3.2.13; 3.7.2.3.2.30; 3.7.3.3.2.12; 3.7.3.3.2.13; and 3.7.3.3.2.33-35"; May 2002, XP002291325.

"Signaling Link Access Control (LAC) Standard for CDMA2000 Spread Spectrum Systems", *Telecommunications Industry Association: "TIA EIA IS-2000. 4-C*, May 2002, Release C, p. vi, chapter 2.1.1.4.1.5", XP002291326.

"3GPP2 Access Network Interfaces Interoperability Specification Release A", *Call Processing and Supplementary Services*, Jan. 18, 2000, pp. 111-183, XP-002201614.

Kruijt et al., "Location Management Strategies for Cellular Mobile Networks", *Electronics & Communication Engineering Journal*, vol. 10, No. 2, Apr. 1, 1998, pp. 64-72, XP-000782774.

Kelley, "Radio Environment Reporting For Fast Call Setup", *Motorola 3rd Generation Partnership Project 2 "3GPP2"*.

* cited by examiner

METHOD AND APPARATUS FOR UPDATING LOCATIONS OF DORMANT MOBILE STATIONS

RELATED APPLICATIONS

The present invention claims priority from U.S. Provisional Patent Application Ser. No. 60/438,748 entitled "Method of Mobile Location Update to Support Fast Call Setup and Reduce Paging Resource Utilization in Wireless Access Networks" filed Jan. 8, 2003 and U.S. Provisional Patent Application Ser. No. 60/469,105 entitled "Method of Mobile Location Update to Support Fast Call Setup and Reduce Paging Resource Utilization in Wireless Access Networks" filed May 9, 2003.

TECHNICAL FIELD

The present invention relates to a method and an apparatus for updating locations of dormant mobile stations and in particular to a method and an apparatus for updating the locations of mobile stations to support fast call setup and reduce paging resource utilization in wireless access networks.

BACKGROUND INFORMATION

Code division multiple access (CDMA) communication systems provide communication services of wireless radio transmissions. In wireless access networks in accordance with CDMA systems, mobile stations (MSs) connected thereto may be in different states, e.g., active and dormant states. Moreover, a power-on MS may be operating in different states (e.g., active state, control-hold state or dormant state in a cdma2000 system). When an MS is in the dormant state, usually, the wireless access network has no knowledge on the location of the dormant MS. It is ideal in the wireless access network to have knowledge of an MS's location at sector level when the MS is in the dormant state, so as to support fast call setup as well as efficient paging.

Currently, the typical manner in which the network will determine the location of the MS will be to broadcast to the entire network. This presents a significant drain on the network resources. Further, in order for the wireless access network to know an MS's location as it moves through the network, an MS in the dormant state has to report on its location over the reverse link random channel whenever the MS performs an idle handoff. However, such a mechanism to update an MS's location significantly increases the reverse link overhead. It is therefore necessary to reduce the overhead caused by the location update and, at the same time, still enable efficient paging.

In some situations, whenever the network wants to bring the MS in the dormant state back to the active state, the network has to page the MS across the entire network to know the location of the MS. After the MS responds to the paging and the network becomes aware of the location of the MS, the network can allocate dedicated resources to the MS and move it to the active state. Usually, this procedure takes about 1–2 seconds. It has been shown that the system capacity and the MS's end-to-end performance are quite sensitive to the dormant to active state transition delay, especially in a network where packet-data applications dominate the traffic load.

In other situations, the network has data to send to an MS that is in a dormant state, but without bringing the MS back to the active state (e.g., short data burst application). In such instances, the network has to send the data across the whole network as it has no information on the location of the MS. This usually consumes significant forward link resources, especially when the short data burst application is widely supported. If the wireless access network is aware of the location of the MSs in the dormant state, the network will send a short data burst to the MS through the right sector and the consumption of the forward link resource will be reduced. However, due to the consideration of the reverse link overhead, the frequency of sending "location update" messages should be configurable based on different scenarios.

Still other situations address the problem associated with locating the dormant MS through the use of current layer 3 messaging for the purpose of location update. Attached with each such layer 3 message is a list of pilot strengths that is redundant and increases the reverse link overhead.

SUMMARY OF THE INVENTION

It is an object of the present invention to provide an improved method and apparatus for updating locations of dormant MSs. The method and apparatus in accordance with the present invention achieve reduction of the overhead caused by the location update and to enable efficient paging.

In accordance with one aspect of the present invention, there is provided a method for determining when a location update message is sent from a mobile station (MS) to a base transceiver station (BTS) when the MS is in a dormant state. The method includes the steps of: starting a first timer when the MS enters a dormant state; starting a second timer when the first timer reaches a predefined value T1; while the first timer is counting and prior to its reaching the predefined value T1, sending a layer 2 location update message whenever the MS performs an idle handoff indicating that the strongest pilot signal strength has changed from one sector to another sector; while the second timer is counting and prior to its reaching a predefined value T2, sending a layer 2 location update message whenever a further criterion is met; and after the second timer has reached the predefined value T2, sending no further layer 2 location update messages.

For example, the further criterion is a time period, an MS's travel distance, a predefined number of idle handoffs.

Advantageously, the values T1 and T2 of the first and second timers are defined based on the condition of the network (e.g., QoS). The values T1 and T2 are provided by the network to the MSs.

In accordance with another aspect of the present invention, there is provided a method for defining the region of a wireless network in which to page a dormant mobile station (MS) when the network determines that data is to be sent to that dormant MS.

The method includes the steps of: starting a first timer when the MS enters a dormant state; starting a second timer when the first timer reaches a predefined value T1; while the first timer is counting and prior to its reaching the predefined value T1, sending an MS page to the sector indicated by the most recent layer 2 location update message received from the MS; while the second timer is counting and prior to its reaching a predefined value T2, sending an MS page to the sectors surrounding the sector indicated in the most recently received layer 2 location update message consistent with the further criterion being used to trigger a location update messages being sent from the MS; and after the second timer has reached the predefined value T2, sending an MS page to all network sectors.

In accordance with yet another aspect, there is provided a method for determining when a location update message needs to be sent from an MS to a base transceiver station (BTS) when the MS is in a dormant state. The method includes the steps of: determining if the MS has moved physically from one geographic region to another region served by a cell sector; and sending a location update message to the network servicing the MS indicating that the two strongest pilot signals are received by the MS.

For example, the step of determining includes the step of determining if the MS has moved physically outside the geographic region served by a plurality of cell sectors defined in a sub-packet zone received previously from the network servicing the MS. Similarly, the step of determining may include the step of: determining if the MS has moved physically into the geographic region served by a cell sector not identified in a list of cell sectors in a sub-packet zone received previously from the network servicing the MS.

Advantageously, the location update message is transmitted as a Level 2 message. The layer 2 location update message contains a message type and an MS identifier, thereby the network updating the location of the MS.

The method may further include the step of: sending by the BTS to the MS a location update acknowledgement message containing a message type and an MS identifier, in response to the layer 2 location update message from the MS. Accordingly, the location update is initiated by the MS.

The methods may further include the steps of sending by the MS in the dormant state to the BTS a reconnect message containing a message type and an MS identifier; and sending by the BTS to the MS a channel assignment message. The MS's dormant to active state transition is initiated by the MS.

The method may further include the steps of: sending by the MS to the BTS a layer 2 location update message containing a message type and an MS identifier; sending by the BTS to the MS a location update acknowledgement message containing a message type and an MS identifier; and sending by the BTS to the MS a message informing MS's active set The BTS initiates an MS's dormant to active state transition.

The method may further include the steps of: sending by the MS to the BTS a layer 2 location update message containing a message type and an MS identifier; sending by the BTS to the MS a location update acknowledgement message containing a message type and an MS identifier, sending by the BTS to the MS a message informing MS's active set; sending by the BTS to the MS a data burst message; and sending by the MS to the BTS a data burst acknowledgement message containing a message type and an MS identifier. The data burst is initiated by the BTS.

In communication services, zones may be registered to track MSs. BTSs need to track MSs to a smaller tracking zone to achieve efficient dormant to active transition. In accordance with the present invention, there is provided a method for tracking zone update to enable the network to page a mobile station (MS) in a smaller area, zones relating to base station controllers (BSCs) that control communications among the BTSs and the MSs, the zones being further defined as smaller zones that are registered for zone tracking. The method includes the steps of: defining the size of the tracking zones; defining the zones of the BTSs; broadcasting tracking zone identifiers; and paging MSs in the tracking zones.

In accordance with one aspect of the present invention, sub-packet zone ID is broadcasted in the overhead message. The MS reports its location on R-CSCH when it detects a tracking zone change. Based on the report from the MSs, the network with the BSC level control can page the MS within the zone where the MS sends the report Advantageously, the MS reports on its change of location in the tracking zone. The reporting of the location change is made on R-CSCH. For example, the same value is assigned to the BTSs in the same tracking zone and the size of the zone is determined. The values are defined for the tracking zone identifier; the number of tracking zone identifiers to be maintained in the tracking zone list; the maximum number of Radio Environment Report Messages that the MS is permitted to transmit before disabling tracking zone reporting the BTS's support of tracking zone reporting indicator; and the tracking zone list which is a list of most recent tracking zone identifier received by the MS.

In accordance with yet another aspect, there is provided a mobile station (MS) for communicating with a base transceiver station (BTS) and a base station controller (BSC) in a wireless communication system, the MS in a dormant state sending a location update message, the MS starting a first timer when the MS enters a dormant state; starting a second timer when the first timer reaches a predefined value T1; while the first timer is counting and prior to its reaching the predefined value T1, sending a layer 2 location update message whenever the MS performs an idle handoff indicating that the strongest pilot signal strength has changed from one sector to another sector; while the second timer is counting and prior to its reaching a predefined value T2, sending a layer 2 location update message whenever a further criterion is met; and after the second timer has reached the predefined value T2, sending no further layer 2 location update messages.

Also, a communication network including the MS and a base transceiver stations (BTSs) may be provided according to an embodiment of the present invention. The network pages a dormant MS when the network determines that data is to be sent to that dormant MS. In the network, the BTS receives the layer 2 location update message and sends a location update acknowledgement message to the MS.

In accordance with yet another aspect of the present invention, there is provided a system for tracking zone update to enable the network to page a mobile station (MS) in a smaller area, zones relating to base station controllers (BSCs) that control communications among the BTSs and the MSs, the zones being further defined as smaller zones that are registered for zone tracking.

In accordance with the present invention, the network is able to know the location of dormant MSs. The overhead caused by the location update can be reduced and still efficient paging is enabled.

DETAILED DESCRIPTION

Figure 1:
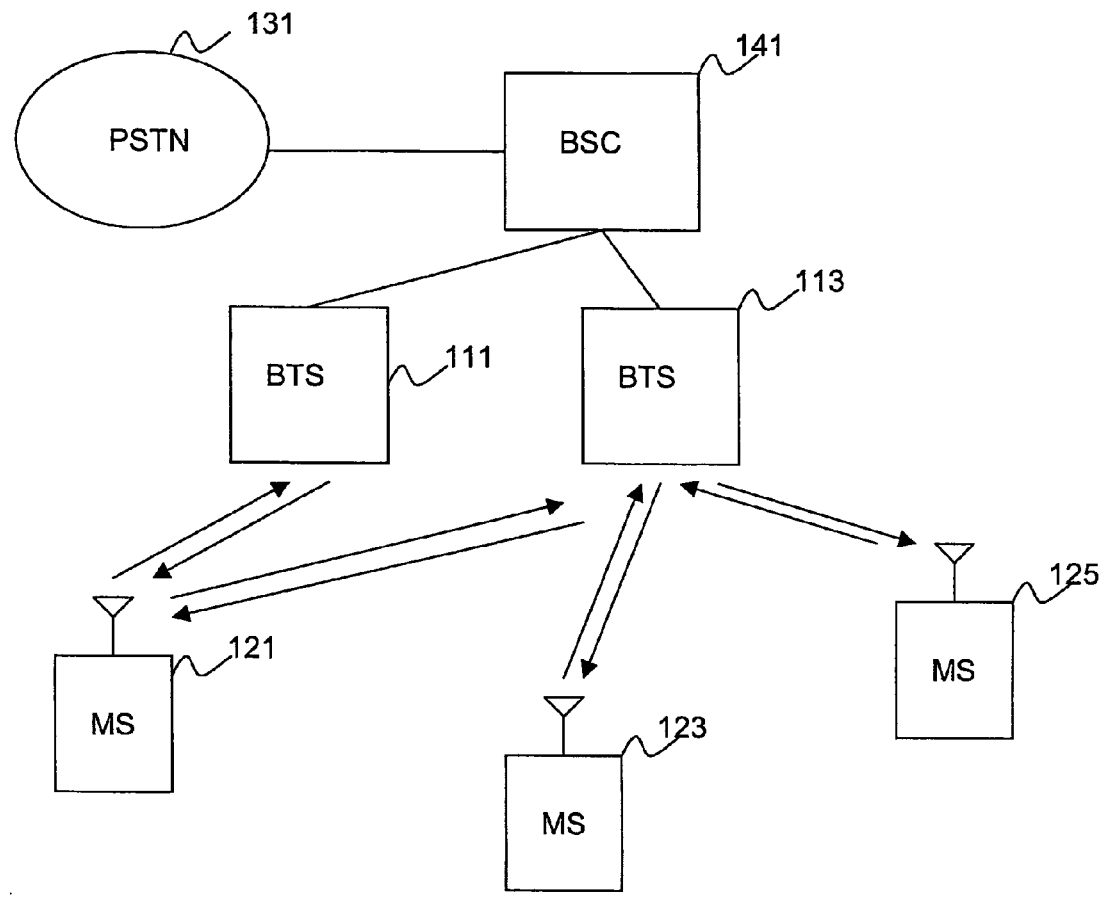
FIG. 1 illustrates a wireless access network based on the CDMA system that can operate in accordance with an embodiment of the present invention.

The present invention uses short layer 2 signalling to facilitate location determination of the MS within a network. The usage of shorter messages (layer 2 message) significantly over-performs the use of longer messages (e.g., layer 3). In accordance with an embodiment of the present invention, a method of three-level location update by MSs in dormant state is provided. The three-level location update in accordance with the present invention may be applied to a cdma2000 system, for example.

In an example of the present invention, a three-level location update mechanism is defined that is a "sector level" location update, an "area level" location update, and a completion of location update (i.e., a "network level").

In the sector level location update, after an MS enters a dormant state, it reports its location whenever it performs an idle handoff. This operation is called a "sector level" location update and operates only for a certain period of time. The purpose of the "sector level" location update is to speed up the packet data state transition from dormant to active.

In the area level location update, after the "sector level" location update period, the MS reduces the frequency of location update. The MS performs location update once every specified number of idle handoffs. This operation is called "area level" location update and is performed for a certain period of time. The purpose of the "area level" location update is to significantly reduce the location update overhead (compared to the case of "sector level" location update) and still provide information on an MS's 'rough location' for the network to estimate the paging area.

In the completion of location update, after the operation of the "area level" location update, an MS stops updating its location completely. At this level, the existing operation procedure for an MS in a dormant state is performed. Regarding the location update, the network operates at three levels: i.e., a sector level, an area level (page control mechanism), and a network level.

Whenever the network requires an MS to go to dormant through a "release" message, two timer values are defined, T1 and T2. Here, T1 specifies the time period when operating on the "sector level" location update and T2 specifies the time period when operating on the "area level" location update. The values of T1 and T2 are defined based on the parameters such as the traffic type, the system load, the MS's type and so on. When an MS enters the dormant state, the timer starts counting and when it reaches T1, it stops. Then, the timer restarts counting and when it reaches T2, it stops.

Due to the "location update" messages being sent over the random channel by the MSs, the "location update" message should be as short as possible in order to increase the throughput and reduce the interference. In this message, only the absolutely necessary information is carried, which is an MS_ID, to uniquely identify the MS.

This MS_ID is sent over a layer 2 message. The MS_ID is assigned either during call setup or whenever the MS enters dormant state. The MS sends the location update layer 2 message on the reverse link random access channel associated with the sector selected by the MSs. Therefore, when the network receives the layer 2 message, both the MS and the sector are uniquely identified.

Any radio environment related information (such as pilot strength measurements) will not be attached with each "location update" message and can be sent on the dedicated channel if needed when an MS is brought back to the active state.

For the sake of reliability of the location update operation, an acknowledgement to the "location update" message is implemented. However, this is an optional operation and the network can decide whether such an acknowledgement is required or not through a control bit along with the "release" message which brings the MS to the dormant state.

The sector level location update is performed. When the MS goes to a dormant state, the timer is set to count and it continues up to T1. In today's system, when the MS is in the dormant state, it continuously monitors the pilot strength of the surrounding sectors. The MS typically selects a sector with the highest pilot strength to monitor any paging information from the network. When a new sector with the highest pilot strength is detected, the MS performs an idle handoff and puts this new sector into its active set (1 member). In accordance with an embodiment of the present invention, the location update is performed after the occurrence of every idle handoff. The location update procedure is performed until the timer reaches T1. Therefore, before the timer counts T1, the network is able to assign resources to the MS immediately on the reported sector and bring the MS back to its active state when needed. This feature is called fast call setup. When the timer reaches T1, the MS starts the "area level" location update procedure, and the timer restarts counting until T2.

When an MS starts the "area level" location update procedure, the timer restarts counting and the MS reports its location through the "location update" message. The trigger for sending the "location update" message is a further criterion such as a timer based, distance based, or count of idle handoff based criteria. The frequency of sending the "location update" message in this period should be much lower than that during the "sector level" operation. If the network needs to page an MS, the network can perform the paging in a larger area than one sector but much smaller area than the entire network and the specifics of this page is implementation specific. For example, if the further criterion is time based (such as every 15 minutes where the period of T2 is perhaps 3 hours), the paging should be in sectors consistent with the distance an MS could travel during that 15 minute interval. If the further criterion is distance based, then the network page need only cover the area in which the MS could travel without causing a location update message being sent. If the further criterion is based on counting idle handoffs, a predefined number of idle handoffs can be counted or a predetermined number of idle handoffs indicating a move of the MS into a new sector can be counted. When the timer reaches T2, the MS starts the "network level" location update procedure.

The network location update is performed. An MS stops sending any location update message and the network has to do the general paging when needed. After an MS stops sending the "location update" message, the existing procedure is resumed.

The network can configure the MS to bypass the "sector level" and/or the "area level" update. By setting T1 as 0, the "sector level" update is bypassed. By setting T2 as 0, the "area level" update is bypassed.

In order to support the three-level location update operation, the existing layer 3 message (resource release message (RRM)/resource release mini-message (RRMM) can be modified to include the values of T1 and T2 and the "location update acknowledge required" flag. The value of T1 and/or T2 could be zero, which means that there is no corresponding location update period. The "location update acknowledge required" flag (one bit) can be set or reset to show whether the acknowledgement to the "location update" message is supported.

In order to support a short message (5 ms layer 2 message), two options are disclosed. 1) Option 1 is to modify the header part in the existing reservation mode of the reverse link enhanced access channel (R-EACH). Such modified header format is shown in Tables hereinafter. Option 2 is to define a new 5 ms frame (9.6 kb/s) for basic mode operation of R-EACH. The layer 2 information carried on this frame is same as Option 1. As the long code mask includes the identification of sector used, R-EACH channel, the relationship between the MS and the selected R-EACH channel of the selected sector is unique.

A new MS_ID is defined and sent in the "location update" message. This MS_ID length can be, e.g., 24 bit, to uniquely identify an MS in the dormant state that supports location update operation. The MS_ID is sent through the reverse link channels associated with the sector which the MS selected as the member of its active set (the long code mask used for the transmission of the "location update" message) includes the sector ID. Therefore, the one-to-one relationship between the MS and the sector is clearly identified. The MS_ID can be assigned either at the registration of the MS or whenever an MS goes to the dormant state through the existing RRM/RRMM.

If the network supports the feature of acknowledging the "location update" message, the ACK can be sent on the forward link channel assignment channel (F-CACH) or on the forward link common control channel (F-CCCH).

If the network wants to bring an MS in the dormant state back to active state before the expiration of T1, the network can send the Enhanced Channel Assignment message (ECAM) on F_CCCH channel and bring the MS back to the active state. If multi-legs operation (multiple members in an active set of MSs in a soft handoff) is required, the network can require the MS to report its radio environment through the pilot strength measurement message (PSMM)/pilot strength measurement mini-message (PSMMM) or the MS can autonomously sends PSMM/PSMMM once it acquires the traffic channel.

When the network wants to either bring an MS back or has short data to send to an MS when the MS is operating in the "area level" location update period, the network decides the paging range based on the parameters which control the rule of location update operation.

In another example of the present invention, the overhead caused by the location update is to define a MAC layer message for the purpose of location update is reduced. When the network brings an MS to the dormant state, the network assigns a specific length (e.g., 24-bit) mobile station identifier, LOC_UP_MS_ID, to the MS in a L3 signalling message.

Whenever an MS in the dormant state reports its location, instead of sending a L3 message with radio environment report, the MS sends its LOC_UP_MS_ID contained in a MAC layer "location update" message over a random channel associated with the sector the MS is monitoring. In this way, the network obtains the information on the MS's location. The additional radio environment report can be sent on the dedicated channel if needed, once a dedicated channel is acquired.

Since the MAC layer "location update" message contains much fewer information bits than a L3 layer message, the MAC layer message can be sent, for example, in a frame with the length of 5 ms at rate of 9.6 kbps. The shorter message length sent over the random channel reduces the interference and increases the throughput by reducing the possibility of collisions. The network can acknowledge each "location update" message by using the existing MAC layer ACK mechanism.

FIG. 1 shows a wireless access network that can operate in accordance with an embodiment of the present invention. In FIG. 1, the network includes a plurality of Base Transceiver Stations (BTSs) (here only two BTSs 111 and 113 are shown for simplicity). Each of the BTSs provides communication links among a plurality of MSs (MSs) (here only three MSs 121, 123 and 125 are shown for simplicity) and between the MSs. The BTSs are connected to a Base Station Controller (BSC) 141 which is connected to a wireline network such as the Public Switching Telephone Network (PSTN) 131. The BSC 141 controls communication operations in the system, the operation being in relation to a back haul between the PSTN 131 and the BTSs. The BSC 141 and BTSs 111 and 113 each have central processing units (CPU) and related data store means (not shown) to perform the communication and other functions. Also, each of the MSs 121–125 has a CPU and related data store means (not shown) to perform the communication and the other functions. Each of the MSs 121–125 provides a timer function to enable the location update operation. The timer's function may be achieved by the CPU of the MS. The timer starts when the MS enters its dormant state. The timer stops when it reaches a specified value T1. Thereafter, the timer restarts and it stops when it reaches another specified value T2.

The network shown in FIG. 1 operates at three levels: i.e., a sector level, an area level (page control mechanism), and a network level. The network and the MSs communicate with the R_EACH messages and the F_CACH messages. Table I shows the format of the release C R_EACH header (32 bits).

TABLE I

| Field | Length (bits) |
| --- | --- |
| HASH_ID | 16 |
| RATE_WORD | 3 |
| MODE_ID | 1 |
| HO_REQ_ID | 0 or 1 |
| NEIGHBOR_PN | 0 or 9 |
| RESERVED | As required |

In Table I,
HASH_ID: Hash Identifier.
  The MS shall set this field to HASH_ID$_S$. HASH_ID is for identification by F_CASH.
RATE_WORD: Rate and frame size indicator.
  The MS shall set this field according to Table II to indicate the requested transmission rate and frame size of the data to be transmitted on R-CCCH. RATE_WORD indicates one of six configurations.
MODE_ID: Mode Identifier.
  The MS shall set this field to '0'. Other values for this field are reserved.
HO_REQ_ID: Handoff Request Identifier.

The MS shall include this field if MODE_ID is set to '0'.

Otherwise, the MS shall omit this field.

NEIGHBOR_PN: Neighbor Pilot PN Offset.

The MS shall include this field only if HO_REQ_ID is included and set to '1'. If included, the MS shall set this field to the neighbor pilot PN offset.

RESERVED: Reserved bits.

The MS shall set this field so that the total number of bits in this message is 32. The MS shall set all the reserved bits to '0'.

Table II shows the RATE_WORD Encoding.

TABLE II

| RATE_WORD | Data Rate (kbps) | Frame Length (ms) | No. of Information (bits) |
|---|---|---|---|
| '000' | 9.6 | 20 | 172 |
| '001' | 19.2 | 20 | 360 |
| '010' | 19.2 | 10 | 172 |
| '011' | 38.4 | 20 | 744 |
| '100' | 38.4 | 10 | 360 |
| '101' | 38.4 | 5 | 172 |
| '110'–'111' | | RESERVED | |

Table III shows the format of a location update message (LUM).

TABLE III

| Field | Length (bits) |
|---|---|
| RESERVED | As required |
| MS_ID | 24 |
| MSG_TYPE | 2 (10) |

In Table III,

RESERVED: Reserved bits.

The MS shall set this field so that the total number of bits in this message is 32. The MS shall set all the reserved bits to '0'.

MS_ID: Mobile station identifier.

The MS shall set this field to LOC_UP_MS_IDs.

MSG_TYPE: Message Type.

The MS shall set this field to '10'.

Table IV shows the format of a reconnect message.

TABLE IV

| Field | Length (bits) |
|---|---|
| RESERVED | As required |
| MS_ID | 24 |
| MSG_TYPE | 2 (01) |

In Table IV,

RESERVED: Reserved bits.

The MS shall set this field so that the total number of bits in this message is 32. The MS shall set all the reserved bits to '0'.

MS_ID: Mobile station identifier.

The MS shall set this field to LOC_UP_MS_IDs.

MSG_TYPE: Message Type.

The MS shall set this field to '01'.

Table V shows the format of a reservation request message.

TABLE V

| Field | Length (bits) |
|---|---|
| RESERVED | As required |
| HASH_ID | 16 |
| MODE_ID | 1 |
| RATE_WORD | 3 |
| HO_REQ_ID | 0 or 1 |
| NEIGHBOR_PN | 0 or 9 |
| MSG_TYPE | 2 (00) |

In Table V,

RESERVED: Reserved bits.

The MS shall set this field so that the total number of bits in this message is 32. The MS shall set all the reserved bits to '0'.

HASH_ID: Hash Identifier.

The MS shall set this field to $HASH\_ID_S$. HASH_ID is for identification by F_CASH.

MODE_ID: Mode Identifier.

The MS shall set this field to '0'. Other values for this field are reserved.

RATE_WORD: Rate and frame size indicator.

The MS shall set this field according to Table II to indicate the requested transmission rate and frame size of the data to be transmitted on R-CCCH.

HO_REQ_ID: Handoff Request Identifier.

The MS shall include this field if MODE_ID is set to '0'.

Otherwise, the MS shall omit this field.

NEIGHBOR_PN: Neighbor Pilot PN Offset.

The MS shall include this field only if HO_REQ_ID is included and set to '1'. If included, the MS shall set this field to the neighbor pilot PN offset.

MSG_TYPE: Message Type.

The MS shall set this field to '00'.

Table VI shows the format of an Early Acknowledgement Channel Assignment Message (EACAM).

TABLE VI

| Field | Length (bits) |
|---|---|
| MSG_TYPE | 3 |
| HASH_ID | 16 |
| RATE_WORD | 3 |
| RCCCH_ID | 5 |
| CPCCH_ID | 2 |
| HO_FLAG | 1 |
| RESERVED | 2 |

In Table VI,

MSG_TYPE: Message Type.

The BTS shall set this field to '000'.

HASH_ID: Hash Identifier.

The BTS shall set this field to the HASH_ID field of the corresponding Enhanced Access Channel header received from the MS.

RATE_WORD: Rate and frame duration indicator.

The BTS shall set this field according to above-mentioned Table II to indicate the transmission rate and frame duration of the R-CCCH that the BTS grants to the MS. The BTS should determine the rate and frame duration based on the RATE_WORD field of the corresponding Enhanced Access Channel header received from the MS.

RCCCH_ID: Reverse Common Channel Identifier.
 The BTS shall set this field to the R-CCCH index that the BTS grants to the MS.
CPCCH_ID: Common Power Control Channel Identifier.
 The BTS shall set this field to the index of the Common Power Control Channel.
HO_FLAG: Handoff Flag.
 The BTS shall set this field to '1' if the HO_REQ_ID field of the corresponding Enhanced Access Channel header received from the MS is equal to '1' and the BTS grants the request for Power Control Subchannel being in soft-handoff. Otherwise, the BTS shall set this field to '0'.
RESERVED: Reserved bits.
 The BTS shall set all the bits in this field to '0'.

Table VII shows the format of a power control channel assignment message (PCCAM).

TABLE VII

| Field | Length (bits) |
|---|---|
| MSG_TYPE | 3 |
| HASH_ID | 16 |
| CPCCH_ID_2 | 2 |
| CPCSCH_2 | 7 |
| POWER_COMB_IND | 1 |
| RESERVED | 3 |

In Table VII,
MSG_TYPE: Message Type.
 The BTS shall set this field to '001'.
HASH_ID: Hash Identifier.
 The BTS shall set this field to the HASH_ID field of the corresponding Enhanced Access Channel header received from the MS.
CPCCH_ID_2: Common Power Control Channel Identifier.
 The BTS shall set this field to the Common PC Channel corresponding to the neighbor BTS.
CPCSCH_2: Common Power Control Subchannel Identifier.
 The BTS shall set this field to the Common PC Subchannel corresponding to the neighbor BTS.
POWER_COMB_IND: PC bits combine Indicator.
 If the BTS instructs the MS to combine the PC bits received from the neighbor BTS, the BTS shall set this field to '1'. Otherwise, the BTS shall set this field to '0'.
RESERVED: Reserved bits.
 The BTS shall set this field to '000'.

Table VIII shows the format of a location update acknowledgment message (LUAM).

TABLE VIII

| Field | Length (bits) |
|---|---|
| MSG_TYPE | 3 (010) |
| MS_ID | 24 |
| RESERVED | As required |

In Table VIII,
MSG_TYPE: Message Type.
 The BTS shall set this field to '010'.
MS_ID: Mobile station identifier.
 The BTS shall set this field to the LOC_UP_MS_ID field of the corresponding Location Update Message received from the MS.
RESERVED: Reserved bits.
 The BTS shall set this field to '00000'.

Table IX shows the format of a modified message format of a data burst acknowledgement message (DBAM).

TABLE IX

| Field | Length (bits) |
|---|---|
| MSG_TYPE | 3 (011) |
| MS_ID | 24 |
| RESERVED | As required |

In Table IX,
MSG_TYPE: Message Type.
 The BTS shall set this field to '011'.
MS_ID: Mobile station identifier.
 The BTS shall set this field to the LOC_UP_MS_ID field of the corresponding Location Update Message received from the MS.
RESERVED: Reserved bits.
 The BTS shall set this field to '00000'.

Figure 2:
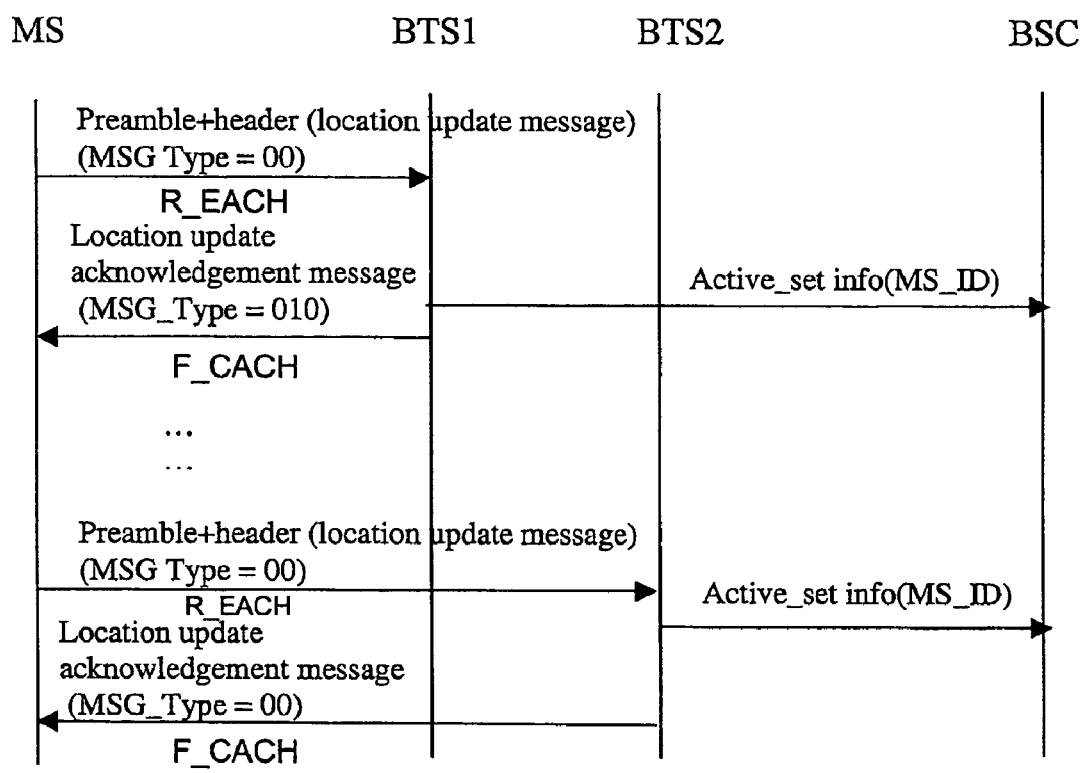
FIG. 2 illustrates a method for updating the location of an MS to facilitate fast paging in accordance with an embodiment of the present invention.

FIG. 2 shows a method of location update by an MS. The BTS and the MS communicate with the R_EACH messages and the F_CACH messages. Referring to FIGS. 1 and 2, the location update initiated by an MS will be described.

The values of T1 and T2 are defined based on the parameters such as the traffic type, the system load, the MS's type and so on. The values of T1 and T2 are determined by the BSC 141 and sent by the BSC 141 (of the sector) to the MSs 121–125.

The MS initiates the location update. When the MS (e.g., the MS 121) enters its dormant state, the timer of the MS starts counting. The MS sends a message consisting of a preamble and header (MSG_Type=00) to the BTS1 (e.g., the BTS 111) through the reverse link. The location update header is shown in Table III (MSG_TYPE of two bits). The BTS1 sends back a location update acknowledgement message (MSG_Type=010) through the forward link to the MS. The location update acknowledgement message of three bits is shown in Table VIII (MSG_TYPE of three bits). Before sending the location update acknowledgement message to the MS, the BTS1 notifies the BSC 141 to identify the update of the active set of the MS (Active_set info (MS_ID)). This is repeated in a case where the timer does not reach T1. The location of the dormant MS is updated.

If the MS 121 moves physically outside the geographic area served by the BTS 111 to another area served by the BTS2 (e.g., the BTS 113), the MS 121 sends a message consisting of a preamble and header (MSG_Type=00) only to the BTS2 through the reverse link. The BTS2 sends back a location update acknowledgement message (MSG_Type=010) through the forward link to the MS. Before responding to the MS, the BTS2 sends the BSC 141 a message identifying the MS (Active_set info (MS_ID)). The location of the dormant MS is updated.

The "location update" message is short in order to increase the throughput and reduce the interference. In this message, only the absolutely necessary information is carried, which is an MS_ID, to uniquely identify the MS. This MS_ID is sent over a layer 2 message. The MS sends the location update layer 2 message on the reverse link random access channel associated with the sector selected by the MSs. Therefore, when the network receives the layer 2 message, both the MS and the sector are uniquely identified.

Any radio environment related information (such as pilot strength measurements) will not be attached with each "location update" message and can be sent on a dedicated channel if needed when an MS is brought back to active state.

In the embodiment, the BTS sends back the acknowledgement message to the MS that initiated the location update. For the sake of reliability of location update operation, an acknowledgement to the "location update" message is implemented. However this is optional operation and the network can decide whether such an acknowledgement is required or not through a control bit along with the "release" message which brings the MS to the dormant state.

The timer is set to count when the MS goes to dormant state and continues counting up to T1. In today's systems, when the MS is in the dormant state, it continuously monitors the pilot strength of the surrounding sectors. The MS typically selects a sector with the highest pilot strength to monitor any paging information from the network. When a new sector with the highest pilot strength is detected, the MS performs an idle handoff and put this new sector into its active set (1 member).

In accordance with an embodiment of the present invention, the location update is performed after the occurrence of every idle handoff. The location update procedure is performed as long as the timer does not reach T1. Therefore, before the timer counts T1, the network is able to assign resources to the MS immediately on the reported sector and bring the MS back to its active state when needed. This feature is called fast call setup. When the timer reaches T1, the MS starts the "area level" location update procedure, and the timer starts counting until T2.

When an MS starts the "area level" location update procedure, the timer starts counting and the MS reports its location through the "location update" message. The trigger for sending the "location update" message is a further criterion such as a timer based, distance based or count of idle handoff based criteria. The frequency of sending the "location update" message in this period should be much lower than that during the "sector level" operation. When the timer reaches T2, the MS starts the "network level" location update procedure. An MS stops sending any location update message and the network has to do the general paging when needed.

If the network needs to page an MS, it can do the paging in a larger area than one sector but much smaller area than the entire network and the specifics of this page is implementation specific. For example, if the further criterion is time based (such as every 15 minutes where the period of T2 is perhaps 3 hours), the paging should be in sectors consistent with the distance an MS could travel during that 15 minute interval. If the further criterion is distance based, then the network page need only cover the area in which the MS could travel without causing a location update message being sent. If the further criterion is based on counting idle handoffs, a predefined number of idle handoffs can be counted or a predetermined number of idle handoffs indicating a move of the MS into a new sector can be counted.

Figures 3A, 3B:
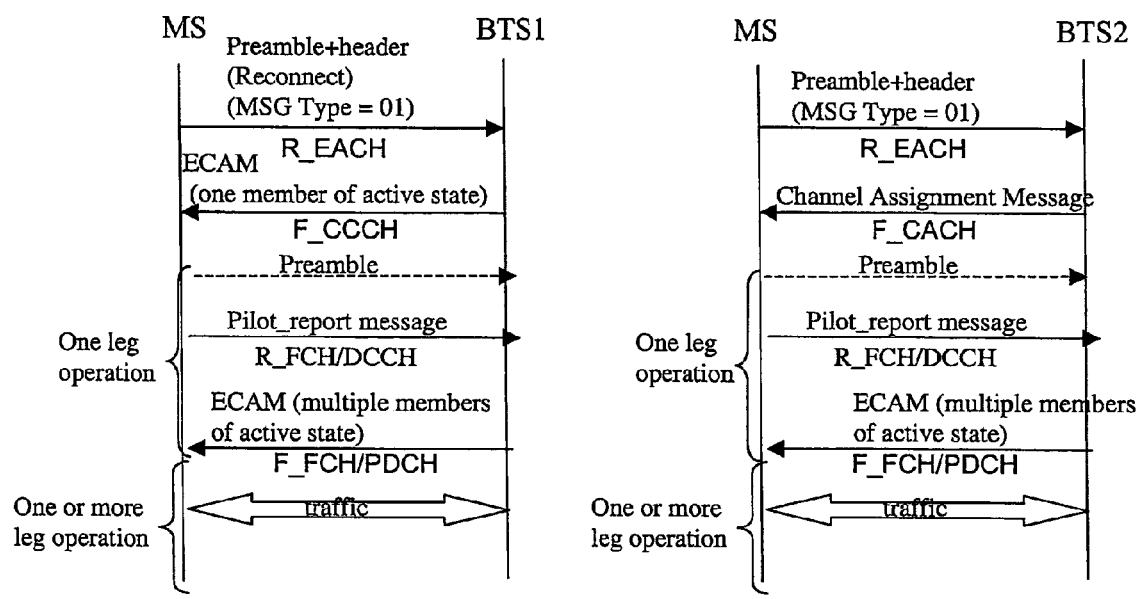
FIGS. 3A and 3B illustrate a method for initiating the MS's dormant to active state transition by the MS in accordance with an embodiment of the present invention.

The network can bring an MS in the dormant state back to active state before the expiration of T1. FIGS. 3A and 3B show the procedure of the dormant to active state transition initiated by the MS. Referring to FIGS. 1 and 3A and 3B, the dormant to active state transition by an MS will be described.

The MS (e.g., the MS 121) sends a message consisting of a preamble and header (MSG_Type=01) to the BTS (e.g., the BTS 111) through the reverse link. The reconnect header is shown in Table IV (MSG_TYPE of two bits). The BTS sends back the enhanced channel assignment message (ECAM). The MS returns to its active state and operates on one leg mode (i.e., one member in an active set). Later, the MS sends a pilot report message to the BTS over R_FCH/DCCH. This achieves higher throughput than R_REACH. Where multi-legs operation is required, the BTS sends ECAM (multiple members of active set) message to the MS over F_FCH/PDCH, because the network requires that the MS to report its radio environment through PSMM/PSMMM or the MS can autonomously sends PSMM/PSMMM once it acquires the traffic channel.

There are two options to send the ECAM via the BTS to the MS. Option 1 is to send the ECAM over F_CCCH as shown in FIG. 3A. Option 2 is to send the ECAM over F_CACH as shown in FIG. 3B. Option 2 is more efficient than option 1, but the length of message in over F_CACH is restricted.

When the network wants to either bring an MS back or has short data to send to an MS when the MS is operation in the "area level" location update period, the network decides the paging range based on the parameters which control the rule of location update operation.

Figures 4A, 4B:
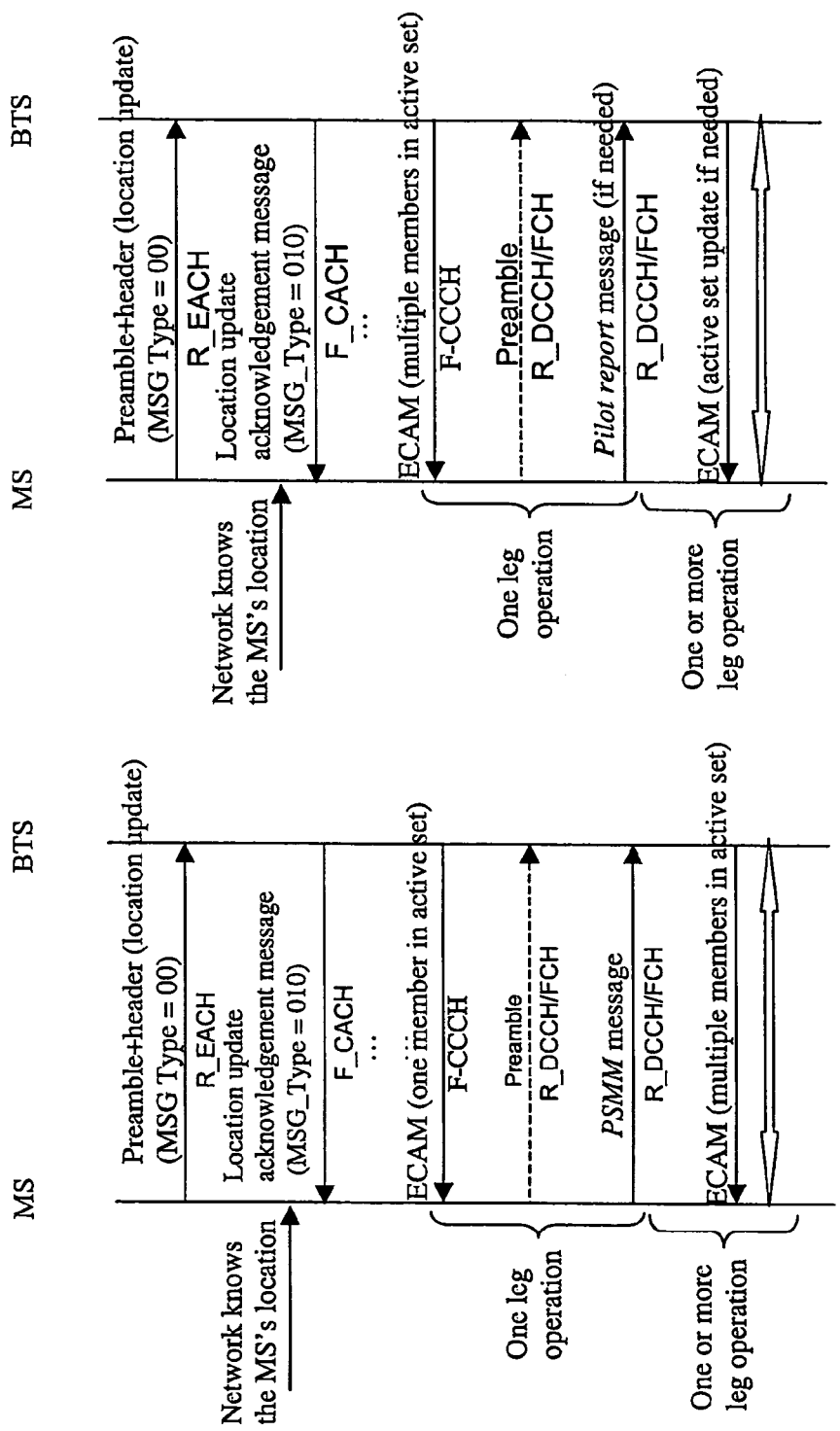
FIGS. 4A and 4B illustrate a method for initiating the MS's dormant to active state transition by the BTS in accordance with an embodiment of the present invention.

The network can bring an MS in the dormant state back to active state initiated by the BTS. FIGS. 4A and 4B show the procedure of the dormant to active state transition initiated by the BTS. Referring to FIGS. 1 and 4A and 4B, the dormant to active state transition initiated by the BTS will be described.

The BTS initiates the location update in response to the MS's location update. The MS (e.g., the MS 121) sends a message consisting of a preamble and header (MSG_Type=00) to the BTS (e.g., the BTS 111) through the reverse link (R_EACH). The location update header is shown in Table III (MSG_TYPE of two bits). The BTS sends back a location update acknowledgement message (MSG_Type=010) through the forward link (F_CACH) to the MS. The location update acknowledgement message of three bits is shown in Table VIII (MSG_TYPE of three bits). In this case, the network is now aware of the location of the MS and the BTS sends the enhanced channel assignment message (ECAM) over F_CCCH. The MS backs to its active state and operates on one leg mode (i.e., one member in an active set). Then, the MS sends a pilot report message to the BTS over R_DCCH/FCH, because the network requires that the MS to report its radio environment through PSMM once it acquires the traffic channel. This achieves higher throughput than R_REACH.

Where multi-legs operation is required, there are two options of sending ECAM by the BTS to the MS. Option 1 is that the BTS sends ECAM of multiple members in active set as shown in FIG. 4A. Option 2 is that the BTS sends ECAM of the MS's active set that is necessary to be updated as shown in FIG. 4B. In Option 2, during the active state, the active set can be gradually updated.

Figure 5:
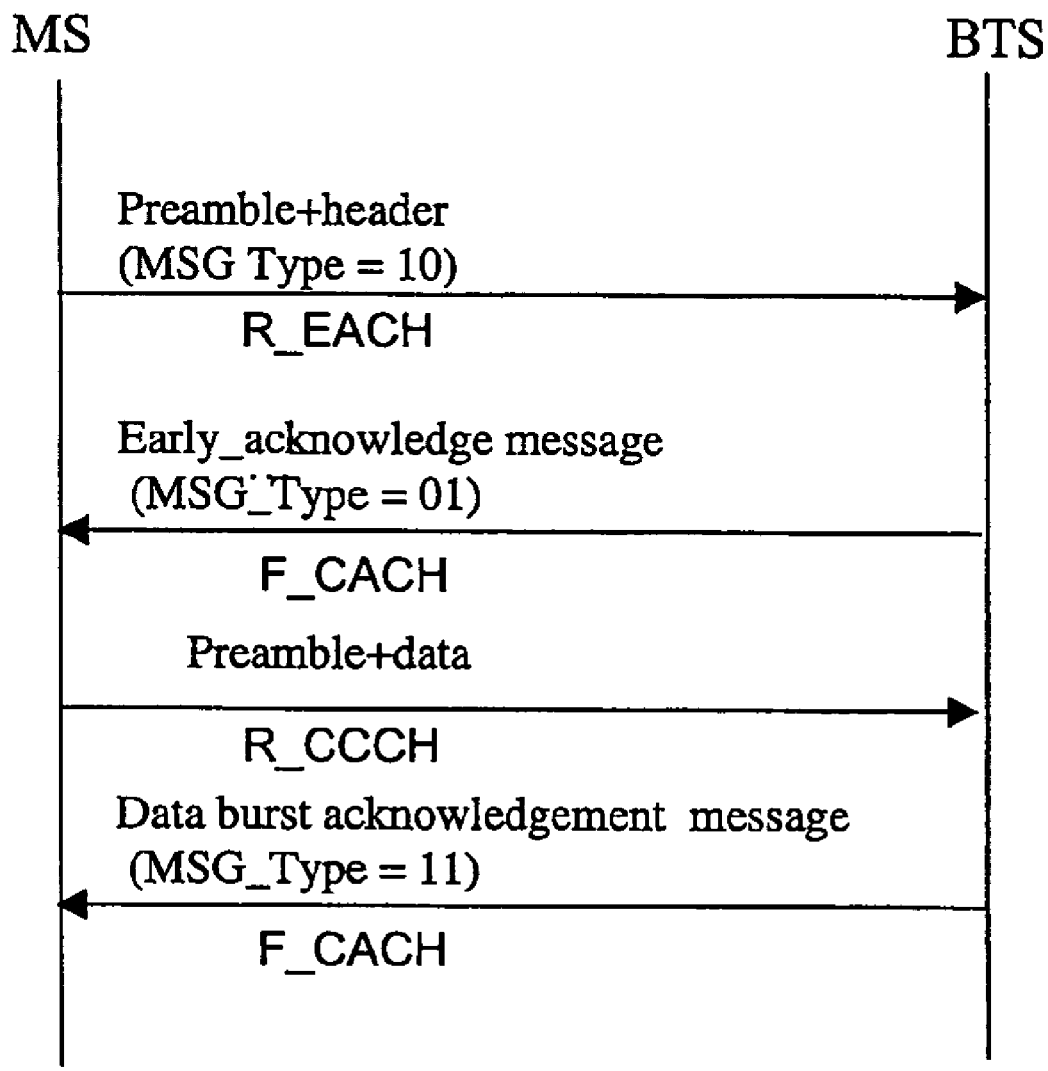
FIG. 5 illustrates a method for initiating the data burst transmission by the MS in accordance with an embodiment of the present invention.

The network can transmit the data burst to an MS in the dormant state. FIG. 5 shows the procedure of the data burst transmission initiated by a dormant MS. Referring to FIGS. 1 and 5, the data burst transition initiated by the MS will be described.

The MS (e.g., the MS 121) sends a message consisting of a preamble and header (MSG_Type=10) to the BTS (e.g., the BTS 111) through the reverse link (R_EACH). The reservation request header is shown in Table V (MSG_TYPE of two bits). The BTS sends back the early acknowledgement message (MSG_Type=01) to the MS over F_CACH. In the embodiment, the format of the Early Acknowledgement Channel Assignment Message (EACAM) shown in Table VI is modified by the location update acknowledgment message shown in Table VIII. The MS sends the preamble and data to the BTS over R_CCCH and the BTS sends data burst acknowledgement message (MSG_Type=11) to the MS over F_CACH. The format of the data burst acknowledgement message is shown in Table IX.

Figure 6:
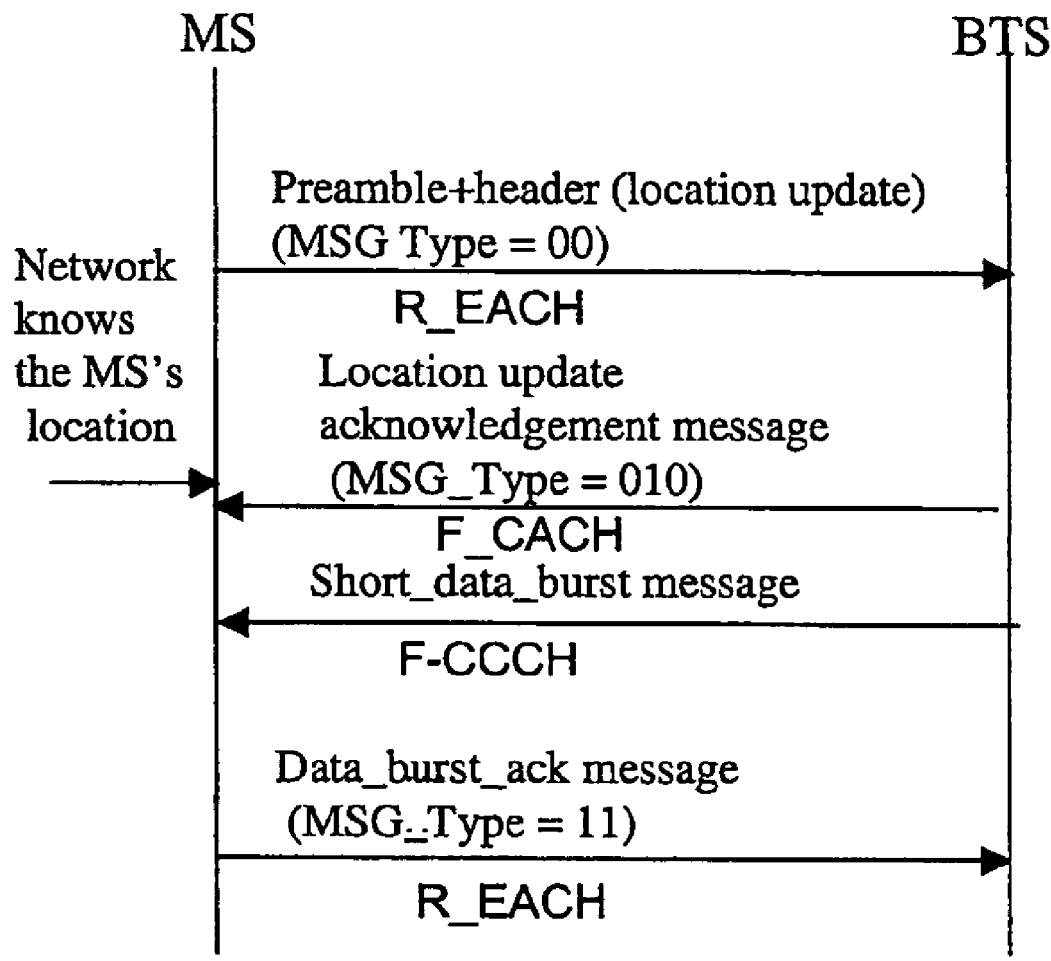
FIG. 6 illustrates a method for initiating the data burst transmission by the BTS in accordance with an embodiment of the present invention.

The network can transmit the data burst to an MS in the dormant state. FIG. 6 shows the procedure of the data burst transmission initiated by the BTS. Referring to FIGS. 1 and 6, the data burst transition initiated by the BTS will be described.

The MS (e.g., the MS 121) sends a message consisting of a preamble and header (MSG_Type=00) to the BTS (e.g., the BTS 111) through the reverse link (R_EACH). The location update message is shown in Table III (MSG_TYPE of two bits). The BTS sends back the location update acknowledgement message (MSG_Type=010) to the MS over F_CACH. In this case, the network is aware of the location of the MS, the network sends a short data burst message to the MS over F_CCCH of the sectors in the "sub-packet data zone" where the MS is. The MS sends the data burst acknowledgment message (MSG_Type=11) to the BTS over R_EACH. The format of the data burst acknowledgment message is shown in Table IX.

In communication services, zones may be registered to track MSs. Such registration zones are efficient to voice services, but not to packet data services. BTSs need to track MS to a smaller tracking zone to achieve more efficient dormant to active transitions. The present invention may provide a method for tracking zone update to enable a base transceiver station (BTS) to page a mobile station (MS) in a smaller area.

In order to improve the paging within smaller tracking zones, in accordance with an embodiment of the present invention, sub-packet zone ID is broadcasted in the overhead message. The MS that support the feature reports its location on R-CSCH when it detects a tracking zone change. The service provider configures the size of the tracking zone and all BTSs in the same tracking zone have same zone value. Based on the report from the MSs, the network with the BSC level control can page the MS within the zone where the MS sends the report.

Figure 7:
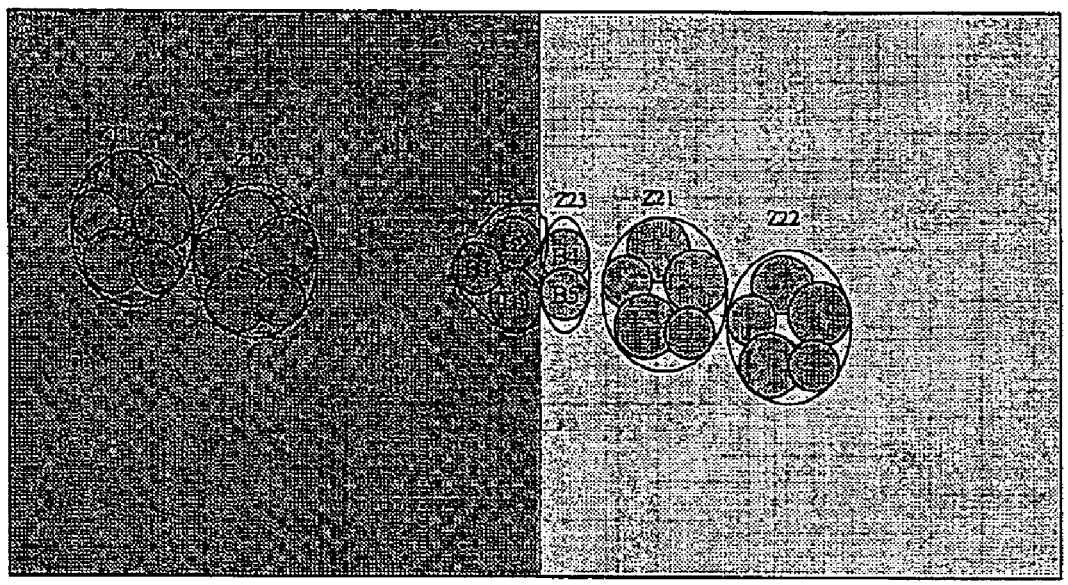
FIG. 7 illustrates service zones defined by areas wherein MSs communicate with the relevant BTSs wherein a method for tracking zone update according to an embodiment of the present invention can operate.

FIG. 7 shows an example of zones containing user MSs. Referring to FIG. 7, zones Z11, Z12 and Z13 belong to the area of one Base Station Controller BSC1. Zones Z21, Z22 and Z23 belong to an adjacent area of another Base Station Controller BSC2. Each zone is divided to a plurality of smaller areas: e.g., B1, B2, B3, B4 and B5. Zone Z13 is adjacent to zone Z23 and B1, B2 and B3 belong to zone Z13 and B4 and B5 belong to zone 23, respectively.

To perform the tracking zone and the paging shown in FIG. 7, the following is necessary as CDMA Numeric Information.

TKZ_ID$_s$—Tracking zone identifier.

TKZ_LIST_LEN$_s$—Number of tracking zone identifier to be maintained in the tracking zone list.

MAX_NUM_TKZ$_s$—The maximum number of Radio Environment Report Messages that the MS is permitted to transit before disabling tracking zone reporting.

TKZ_SUP$_s$—BTS support of tracking zone reporting indicator.

TKZ_LIST$_s$—Tracking zone list. It is a list of most recent TKZ_IDs MS have received.

In the MS in the dormant state, the MS monitors the Paging Channel or the Quick Paging Channel or Forward Common Control Channel/Primary Broadcast Control Channel. The MS can receive messages, receive an incoming call (MS terminated call), initiate a call (MS originated call), cancel a priority access and channel assignment (PACA) call, initiate a registration, or initiate a message transmission.

The MS may monitor the Quick Paging Channel to determine if it should receive messages from the Paging Channel or Forward Common Control Channel.

Upon entering the Mobile Station Dormant State from the Mobile Station Initialization State, the MS shall perform the following:

If SR1_BCCH_NON_TD_INCL$_S$ is equal to '1', or if SR1_TD_INCL$_s$ is equal to '1' and the MS supports the transmit diversity mode specified by SR_TD_MODE$_s$, or if the MS supports Spreading Rate 3 on the common channel and SR3_INCL$_s$ is equal to '1', the MS shall perform the following:

Set its Primary Broadcast Control Channel code channel to BCCH$_s$,

Set the Primary Broadcast Control Channel data rate as determined by BRAT$_s$,

Set the Primary Broadcast Control Channel code rate as determined by BCCH_CODE_RATE$_s$, Set SLOTTED$_s$ to YES if T_SLOTTED$_s$ is equal to '00000000' or if the MS does not support the slotted timer; otherwise, enable the $T_{MS\_Slotted}$ timer with the duration specified by T_SLOTTED$_s$ and set SLOTTED$_s$ to NO, and Perform common channel supervision. The initial parameter is set up when the MS enters the dormant state from the MS initialization state.

Otherwise, the MS shall perform the following:

Set its code channel to PAGECH$_s$,

Set the Paging Channel data rate as determined by PRAT$_s$,

Set SLOTTED$_s$ to YES if T_SLOTTED$_s$ is equal to '00000000' or if the MS does not support the slotted timer; otherwise, enable the $T_{MS\_Slotted}$ timer with the duration specified by T_SLOTTED$_s$ and set SLOTTED$_s$ to NO, and Perform Paging Channel supervision.

Upon entering the Mobile Station Dormant State from the Mobile Station Control on the Traffic Channel State, the MS shall perform all of the following:

Set SLOTTED$_s$ to YES if T_SLOTTED$_s$ is equal to '00000000' or if the MS does not support the slotted timer, otherwise, enable the $T_{MS\_Slotted}$ timer with the duration specified by T_SLOTTED$_s$ and set SLOTTED$_s$ to NO.

Perform common channel supervision.

If TKZ_ENABLED is YES and the tracking zone update timer is not enabled, the MS shall perform the following:

Initialize the tracking zone list TKZ_LIST$_s$ with the length of TKZ_LIST_LEN$_s$ and add TKZ_ID$_s$ to the TKZ_LIST$_s$, Set the tracking zone update timer to infinity if TKZ_UPDATE_PRD$_s$ is equal to '1111'; otherwise, the MS shall set the tracking zone update timer to $2^{TKZ\_UPDATE\_PRD_S+6}$ seconds, then Enable the tracking zone update timer.

If REDIRECTION$_s$, PACA$_s$, and NDSS_ORIG$_s$ are equal to disabled, the MS may exit the Mobile Station Dormant State at any time and enter the System Determination Substate of the Mobile Station Initialization State with a reselection indication.

While in the Mobile Station Dormant State, the MS shall perform the following procedures:

The MS shall perform Paging Channel or Forward Common Control Channel monitoring procedures.

The MS shall perform message acknowledgment procedures with the received forward message from the BTS.

If the key set-up timer expires or has expired, the MS shall set REG_SECURITY_RESYNC (formerly called REG_ENCRYPT_RESYNC) to YES and the MS shall go to the System Determination Substate with an encryption/message integrity failure indication.

If TKZ_ENABLED is set to YES, the MS shall perform the following:

If TKZ_ID$_s$ is not equal to any entry in TKZ_LIST$_s$, the MS shall send a Radio Environment Report Message by performing the Mobile Station Message Transmission Operation.

If TKZ timer of any entry in TKZ_LIST$_s$ has expired, the MS shall delete that entry.

If the tracking zone update timer expires, the MS shall disable the tracking zone update timer and set TKZ_ENABLED to NO.

Upon expiration of the radio environment report timer, the MS shall disable the timer and set RER_ENABLED (the radio environment report) to NO. If TKZ_INFO_INCL$_s$ is equal to '1', then the MS shall perform the following:

Set TKZ_ENABLED to YES.

Initialize the tracking zone list TKZ_LIST$_s$ with the length of TKZ_LIST_LEN$_s$ and add TKZ_ID$_s$ to the TKZ_LIST$_s$, Set the tracking zone update timer to infinity if TKZ_UPDATE_PRD$_s$ is equal to '1111'; otherwise, the MS shall set the tracking zone update timer to $2^{TKZ\_UPDATE\_PRD_s+6}$ seconds, then Enable the tracking zone update timer.

Whenever an Extended System Parameters Message is received on the Paging Channel, the configuration message sequence number, CONFIG_MSG_SEQ$_r$, shall be compared to that stored in EXT_SYS_PAR_MSG_SEQ$_s$. If the comparison results in a match, the MS may ignore the message. If the comparison results in a mismatch, then the MS shall process the remaining fields in the message as follows.

The MS shall store MS initiated position location determination supported indicator (MS_INIT_POS_LOC_SUP_IND$_s$=MS_INIT_POS_LOC_SUP_IND$_r$).

If the MS supports tracking zone, the MS shall store tracking zone supported indicator (TKZ_SUP$_s$=TKZ_SUP$_r$).

If TKZ_SUP$_s$ is equal to '1', the MS shall store the tracking zone identifier (TKZ_ID$_s$=TKZ_ID$_r$).

If TKZ_ENABLED is YES and the tracking zone update timer is not enabled, the MS shall perform the following:

Initialize the tracking zone list TKZ_LIST$_s$ with the length of TKZ_LIST_LEN$_s$ and add TKZ_ID$_s$ to the TKZ_LIST$_s$, Set the tracking zone update timer to infinity if TKZ_UPDATE_PRD$_s$ is equal to '1111'; otherwise, the MS shall set the tracking zone update timer to $2^{TKZ\_UPDATE\_PRD_s+6}$ seconds, then Enable the tracking zone update timer.

Whenever an ANSI-41 System Parameters Message is received, the configuration message sequence number, CONFIG_MSG_SEQ$_r$, shall be compared to that stored in A41_SYS_PAR_MSG_SEQ$_s$. If the comparison results in a match, the MS may ignore the message. If the comparison results in a mismatch, then the MS shall process the remaining fields in the message to store parameters.

The MS shall store the following parameters:

Configuration message sequence number (CONFIG_MSG_SEQ$_s$=CONFIG_MSG_SEQ$_r$, A41_SYS_PAR_MSG_SEQ$_s$=CONFIG_MSG_SEQ$_r$)

Home registration indicator (HOME_REG$_s$=HOME_REG$_r$)

If MSG_INTEGRITY_SUP$_r$ is equal to '1' and SIG_INTEGRITY_SUP_INCL$_r$ is equal to '1', the MS shall store the message integrity algorithms that the BTS supports (SIG_INTEGRITY_SUP$_s$=SIG_INTEGRITY_SUP$_r$); otherwise, the MS shall set SIG_INTEGRITY_SUP$_s$ to '00000000'.

The MS shall also store the following parameters if the MS is not in the Origination Attempt Substate or Page Response Substate:

System identification (SID$_s$=SID$_r$)

Network identification (NID$_s$=NID$_r$)

Registration zone (REG_ZONE$_s$=REG_ZONE$_r$)

If DIST_REG_INCL is equal to '0', then the MS shall set REG_DIST equal to '00000000000'.

If the MS supports tracking zone, the MS shall store tracking zone supported indicator (TKZ_SUP$_s$=TKZ_SUP$_r$). If TKZ_SUP$_s$ is equal to '1', the MS shall store the tracking zone identifier (TKZ_ID$_s$=TKZ_ID$_r$).

If TKZ_ENABLED is set to YES and the tracking zone update timer is not enabled, the MS shall perform the following:

Initialize the tracking zone list TKZ_LIST$_s$ with the length of TKZ_LIST_LEN$_s$ and add TKZ_ID$_s$ to the TKZ_LIST$_s$, Set the tracking zone update timer to infinity if TKZ_UPDATE_PRD$_s$ is equal to '1111'; otherwise, the MS shall set the tracking zone update timer to $2^{TKZ\_UPDATE\_PRD_s+6}$ seconds, then Enable the tracking zone update timer.

If the MS supports the Mobile Station Message Transmission Operation, the operation will be performed when the user directs the MS to transmit a Data Burst Message, or when the MS detects a change in the hook status since the last time when the MS sent hook status information and the MS supports the Device Information Message on the R-CSCH, or when the MS detects that a Radio Environment Report Message is required to be transmitted on the R-CSCH.

If the MS supports the Mobile Station Message Transmission Operation, the MS shall set CURR_ACC_MSG_SEQ to NULL.

If the MS supports the Mobile Station Message Transmission Operation and the operation is performed when the user directs the MS to transmit a Data Burst Message, the MS shall enter the Update Overhead Information Substate of the System Access State with a message transmission indication within $T_{33m}$ seconds.

If the MS supports the Mobile Station Message Transmission Operation and the operation is performed when the MS detects a change in the hook status since the last time when the MS sent hook status information, the MS shall enter the Update Overhead Information Substate of the System Access State with a hook status indication within $T_{33m}$ seconds.

If the MS supports the Mobile Station Message Transmission Operation and the operation is performed when the MS detects that a Radio Environment Report Message is required to be transmitted on the R-CSCH, the MS shall perform the following:

If RER_ENABLED is set to YES, the MS shall enter the Update Overhead Information Substate of the System Access State with a radio environment report indication within $T_{33m}$ seconds.

Otherwise, if TKZ_ENABLED is set to YES, the MS shall enter the Update Overhead Information Substate of the System Access State with a tracking zone report indication within $T_{33m}$ seconds.

The MS enters different substates dependent upon the entry of the Update Overhead Information Substate as follows:

If this substate was entered with a message transmission indication, the MS shall enter the Mobile Station Message Transmission Substate with a message transmission indication.

If this substate was entered with a hook status indication, the MS shall enter the Mobile Station Message Transmission Substate with a hook status indication.

If this substate was entered with a PACA cancel indication, the MS shall enter the PACA Cancel Substate.

If this substate was entered with a radio environment report indication, the MS shall enter the Mobile Station Message Transmission Substate with a radio environment report indication.

If this substate was entered with a tracking zone report indication, the MS shall enter the Mobile Station Message Transmission Substate with a tracking zone report indication.

In the Mobile Station Message Transmission Substate, the MS sends a Data Burst Message, a Device Information Message, or a Radio Environment Report Message. If the BTS responds with an authentication request, the MS responds in this substate.

Upon entering the Mobile Station Message Transmission Substate, the MS shall transmit the message as follows:

If the MS entered this substate with a message transmission indication, the MS shall transmit the Data Burst Message to the BTS.

If the MS entered this substate with a hook status indication, the MS shall set the autonomous message timer equal to AUTO_MSG_INTERVAL$_s$ and shall start the timer. The MS shall transmit the Device Information Message to the BTS, with the RECORD_TYPE field of the message set to 00100000 and the Hook Indicator field set to the current hook status.

If the MS entered this substate with a radio environment report indication, the MS shall transmit the Radio Environment Report Message to the BTS in assured mode, and increment RER_COUNT (the radio environment report count) upon receiving confirmation of delivery. If, after incrementing, RER_COUNT is equal to MAX_NUM_RER$_s$, the MS shall set RER_ENABLED to NO. If RER_ENABLED is set to NO and TKZ_INFO_INCL$_s$ is equal to '1', the MS shall perform the following:

Set TKZ_ENABLED to YES.

Initialize the tracking zone list TKZ_LIST$_s$ with the length of TKZ_LIST_LEN$_s$ and add TKZ_ED$_s$ to the TKZ_LIST$_s$.

Set the tracking zone update timer to infinity if TKZ_UPDATE_PRD$_s$ is equal to '1111'; otherwise, the MS shall set the tracking zone update timer to $2^{TKZ\_UPDATE\_PRD_s+6}$ seconds, then Enabled the tracking zone update timer.

If the MS entered this substate with a tracking zone report indication, the MS shall perform the following:

The MS shall transmit the Radio Environment Report Message to the BTS.

If the MS receives confirmation of delivery of Radio Environment Report Message, the MS shall add TKZ_ID to TKZ_LIST$_s$ and start the TKZ timer for this TKZ_ID$_s$. If TKZ_LIST$_s$ is full, the entry with active TKZ timer with smallest remaining TKZ timer value shall be removed from the list before adding the new entry.

The MS shall increment TKZ_COUNT upon receiving confirmation of delivery. If, after incrementing, TKZ_COUNT is equal to MAX_NUM_TKZ$_s$, the MS shall disable the tracking zone update timer and set TKZ_ENABLED to NO.

While in the Mobile Station Message Transmission Substate, the MS shall monitor the Paging Channel or the Forward Common Control Channel. The MS determines and declares in a case of a loss of the Paging Channel or the Forward Common Control Channel.

In the Traffic Channel Substate, the MS may exchange Traffic Channel frames with the BTS in accordance with the current service configuration. The MS may perform the gating operation of Reverse Pilot Channel.

While in the Traffic Channel Substate, the MS shall perform the following:

The MS shall perform Forward Traffic Channel supervision. If a loss of the Forward Traffic Channel is declared, the layer 3 shall terminate all Call Control instances, and shall enter the System Determination Substate of the Mobile Station Initialization State with a system lost indication.

The MS may send a Pilot Strength Measurement Mini Message to report pilot strength order change information, periodic pilot strength information, or threshold based pilot strength information, as specified in the Mobile Assisted Burst Operation Parameters Message.

The MS shall set TKZ_ENABLED to NO, set TKZ_LIST$_s$ to NULL, and disable the tracking zone update timer.

The MS shall adjust its transmit power.

In the Release Substate, the MS confirms the disconnect of all calls and physical channels. Upon entering the Release Substate, the MS shall perform the following:

The MS shall set the substate timer for $T_{55m}$ seconds.

The MS shall set RER_ENABLED to its default value of NO.

In response to an Extended Release Message, procedures for exiting the Release Substate are made. If the MS received an Extended Release Message with the RER_INFO_INCL (the radio environment report information included indicator) field set to '1', then the MS shall set RER_ENABLED to YES, RER_COUNT to 0, and shall perform the following:

The MS shall store the following:

maximum allowed number of radio environment reports (MAX_NUM_RER$_s$=infinity, if MAX_NUM_RER_IDX$_r$ is equal to '111'; otherwise, MAX_NUM_RER$_s$=$2^{MAX\_NUM\_RER\_IDX_r}$).

maximum number of pilots to maintain in RER_PILOT_LIST (MAX_RER_PILOT_LIST_SIZE$_s$=MAX_RER_PILOT_LIST_SIZE$_r$).

system identification for radio environment reporting ($RER\_SID_s=SID_s$).

network identification for radio environment reporting ($RER\_NID_s=NID_s$).

The MS shall initialize the radio environment report pilot list (RER_PILOT_LIST). The initial RER_PILOT_LIST is defined as the set of pilots that made up the Active Set on the Traffic Channel.

The MS shall enable the radio environment report timer with an initial value of infinity if $RER\_TIME_r$ is equal to '111'; otherwise, the MS shall enable the radio environment report timer with an initial value of $2^{RER\_TIME_r}$ seconds if $RER\_TIME\_UNIT_r$ is equal to '00', or $2^{RER\_TIME_r}$ minutes if $RER\_TIME\_UNIT_r$ is equal to '01', or $2^{RER\_TIME_r}$ hours if $RER\_TIME\_UNIT_r$ is equal to '10'.

If the MS received an Extended Release Message with the field of the tracking zone reporting information included indicator set to '1' and the BTS support of tracking zone reporting indicator is equal to '1', then the MS shall set TKZ_COUNT to 0, and shall perform the following:

The MS shall store the following:

Tracking zone list length ($TKZ\_LIST\_LEN_s=TKZ\_LIST\_LEN_r$).

TKZ timer ($TKZ\_TIMER_s=TKZ\_TIMER_r$).

Maximum allowed number of tracking zone reports ($MAX\_NUM\_TKZ_s$=infinity, if MAX_NUM_TKZ_IDX$_r$ is equal to '111'; otherwise, $MAX\_NUM\_TKZ_s=2^{MAX\_NUM\_TKZ\_IDX_r}$)

Tracking zone update period ($TKZ\_UPDATE\_PRD_s=TKZ\_UPDATE\_PRD_r$).

If RER_INFO_INCL is equal to '0', the MS shall set TKZ_ENABLED to YES.

If RER_INFO_INCL is equal to '1', the MS shall set ($TKZ\_INFO\_INCL_s=TKZ\_INFO_{INCLr}$).

The MS shall perform the procedures to determine whether to enter the Mobile Station Dormant State or System Determination Substate of the Mobile Station Initialization State.

If the MS received a Release Order with ORDQ equal to '00000011' (Enhanced Release Order), the MS shall perform the procedures to exit the Release Substate.

The followings describe the messages and their PDU formats sent by the MS on the R-CSCH. The messages sent on the R-CSCH are summarized in Table X.

TABLE X

| Message Name | MSG_TAG | P_REV_IN_USE* |
|---|---|---|
| Registration Message | RGM | All |
| Order Message | ORDM | All |
| Data Burst Message | DBM | All |
| Authentication Response Message | AURSPM | ≧10 |
| Authentication Resynchronization Message | AURSYNM | ≧10 |
| Reconnect Message | RCNM | ≧9 |
| Radio Environment Report Message | RERM | ≧11 |

In Table X, P_REV_IN_USE (*) equal to "All" implies all values applicable to the Band Class.

MSG_TAG: RERM—The RERM is shown in Table XI.

TABLE XI

| Field | Length (bits) |
|---|---|
| LAST_REPORT | 1 |
| TKZ_REPORT | 1 |

In Table XI,

LAST_REPORT—Last radio environment report indicator.

The MS shall set this field to '1' if RER_COUNT is equal to (MAX_NUM_RER$_s$-1) or TKZ_COUNT is equal to ((MAX_NUM_TKZ$_s$-1); otherwise, the MS shall set this field to '0'.

TKZ_REPORT—Tracking zone report indicator.

The MS shall set this field to '1' if the Radio Environment Report Message is sent for tracking zone report; otherwise, the MS shall set this field to '0'.

The Capability Information record identifies whether the following optional or MOB_P_REV dependent features are supported by the MS. The format of the indicator message is shown in Table XII.

TABLE XII

| Type-Specific Field | Length (bits) |
|---|---|
| PDCH_CHM_SUPPORTED | 1 |
| RER_SUPPORTED | 1 |
| TKZ_SUPPORTED | 1 |
| RESERVED | 0–7 (as needed) |

In Table XII,

RER_SUPPORTED—Radio environment reporting supported indicator.

The MS shall set this field to '1' if it supports radio environment reporting on the R-CSCH; otherwise, the MS shall set this field to '0'.

TKZ_SUPPORTED—Tracking zone supported indicator.

The MS shall set this field to '1' if it supports tracking zone reporting on the R-CSCH; otherwise, the MS shall set this field to '0'.

MSG_TAG: ESPM—The format of the Extended System Parameters Message (ESPM)is shown in Table XIII.

TABLE XIII

| Field | Length (bits) |
|---|---|
| NUM_PDCCH | 0 or 3 |
| NUM_PDCCH+1 occurrences of the following record: | |
| {(NUM_PDCCH+1) FOR_PDCCH_WALSH }(NUM_PDCCH+1) | 0 or 6 |
| TKZ_SUPPORTED | 1 |
| TKZ_ID | 0 or 8 |

In Table XIII,

TKZ_SUPPORTED—Tracking zone supported indicator.

The BTS shall set this field to '1' if the tracking zone is supported; otherwise, the BTS shall set this field to '0'.

TKZ_ID—Tracking zone identifier.

If TKZ_SUP is set to '1', the BTS shall set this field to its tracking zone identifier, otherwise, the BTS shall omit this field.

MSG_TAG:A41SPM—The format of the ANSI-41 System Parameters Message (A41SPM) is shown in Table XIV.

TABLE XIV

| Field | Length (bits) |
|---|---|
| PILOT_PN | 9 |
| CONFIG_MSG_SEQ | 6 |
| SID | 15 |
| NID | 16 |
| PACKET_ZONE_ID | 8 |
| REG_ZONE | 12 |
| SIG_INTEGRITY_SUP | 0 or 8 |
| TKZ_SUPPORTED | 1 |
| TKZ_ID | 0 or 8 |

In Table XIV,

SIG_INTEGRITY_SUP—Signaling integrity algorithm supported by the BTS.

If MSG_INTEGRITY_SUP is set to '1', the BTS shall set this field as follows; otherwise, the BTS shall omit this field.

The BTS shall set this field to indicate the supported message integrity algorithms in addition to the default integrity algorithm.

The BTS shall set each subfield to '1' if the corresponding message integrity algorithm is supported by the BTS; otherwise, the BTS shall set the subfield to '0'.

The BTS shall set the RESERVED subfield to '00000000'.

TKZ_SUPPORTED—Tracking zone supported indicator.

The BTS shall set this field to '1' if the tracking zone is supported; otherwise, the BTS shall set this field to '0'.

TKZ_ID—Tracking zone identifier.

If TKZ_SUP is set to '1', the BTS shall set this field to its tracking zone identifier; otherwise, the BTS shall omit this field.

MSG_TAG: ERM—The format of the Extended Release Message (ERM) is shown in Table XV.

TABLE XV

| Field | Length (bits) |
|---|---|
| RER_INFO_INCL | 1 |
| MAX_NUM_RER_IDX | 0 or 3 |
| RER_TIME | 0 or 3 |
| RER_TIME_UNIT | 0 or 2 |
| MAX_RER_PILOT_LIST_SIZE | 0 or 3 |
| TKZ_INFO_INCL | 1 |
| MAX_NUM_TKZ_IDX | 0 or 3 |
| TKZ_UPDATE_PRD | 0 or 4 |
| TKZ_LIST_LEN | 0 or 4 |
| TKZ_TIMER | 0 or 8 |

In Table XV,

MAX_RER_LIST_SIZE—Maximum number of pilots to maintain in RER_PILOT_LIST.

If RER_INFO_INCL is set to '0', the BTS shall omit this field; otherwise, the BTS shall include this field and set it as follows:

The BTS shall set this field to the maximum number of pilots other than the Active Set pilot that the MS is to maintain in RER_PILOT_LIST. The BTS shall set this field to a value in the range 0 to 5 inclusive.

TKZ_INFO_INCL—Tracking zone reporting information included indicator.

If USE_EXT_CH_IND is equal to '0' and CH_IND is equal to '111', or the physical channels indicated by the two least significant bits of CH_IND includes all the physical channels (FCH, DCCH, or both) currently being processed by the MS, the BTS shall set this field as follows:

If the tracking zone reporting related fields are included in this message, the BTS shall set this field to '1'; otherwise, the BTS shall set this field to '0'.

Otherwise, the BTS shall set this field to '0.

MAX_NUM_TKZ_IDX—Maximum number of tracking zone reporting index.

If the tracking zone reporting information included indicator is set to '0', the BTS shall omit this field; otherwise, the BTS shall include this field and set it as follows:

The BTS shall set this field to the maximum number of tracking zone reports that the MS is allowed to transmit, expressed as $2^{MAX\_NUM\_TKZ\_IDX}$ where $0 \leq MAX\_NUM\_TKZ\_IDX \leq 6$. If the MS is allowed to transmit an unlimited number of tracking zone reports, then the BTS shall set this field to '111'.

TKZ_UPDATE_PRD—Tracking zone update period.

If the tracking zone reporting information included indicator is set to '0', the BTS shall omit this field; otherwise, the BTS shall include this field and set it as follows:

The BTS shall set this field such that the desired tracking zone update timer value is $2^{TKZ\_UPDATE\_PRD+6}$ seconds. If the value of the timer is infinite, then the BTS shall set this field to '1111'.

TKZ_LIST_LEN—Tracking zone list length.

If the tracking zone reporting information included indicator is set to '0', the BTS shall omit this field; otherwise, the BTS shall include this field and set it as follows:

The BTS shall set this field to the length of the tracking zone list minus one.

TKZ_TIMER—tracking zone timer.

If the tracking zone reporting information included indicator is set to '0', the BTS shall omit this field; otherwise, the BTS shall include this field and set it as follows:

The BTS shall set this field to the value of the tracking zone timer (in units of seconds) minus one.

The radio environment report fields are required for being set to support tracking zone reporting by the MS while in the dormant state. If $P\_REV\_IN\_USE_s$ is greater than or equal to four, the MS shall include the radio environment report fields; otherwise, the MS shall omit the radio environment report fields. When the MS includes time-sensitive radio environment report fields in the PDU being transmitted, the MS shall set the time-sensitive radio environment report fields.

The MS shall select the NUM_ADD_PILOTS and NUM_AUX_PILOTS pilots to be reported from among the pilots monitored in the ACCESS_HO_LIST and OTHER_REPORTED_LIST, and shall include the respective records in the PDU, as a list with NUM_ADD_PILOTS and NUM_AUX_PILOTS entries, according to the following procedure (or equivalent):

The list shall be empty initially and new records shall be added consecutively from the start of the list, without duplicates, until the list contains NUM_ADD_PILOTS plus NUM_AUX_PILOTS records.

No record corresponding to the pilot in the Active Set shall be part of the list.

If FIRST_IS_ACTIVE is equal to '0', a record corresponding to the common pilot shall be added to the list.

If PREVIOUS_ACTIVE_PILOT$_s$ is not NULL, a record corresponding to the pilot identified by PREVIOUS_ACTIVE_PILOT$_s$ shall be added to the list, unless already present in the list.

Records corresponding to pilots in the ACCESS_HO_LIST shall be added to the list without the encapsulated PDU exceeding max_msg_size for the channel on which the PDU will be sent.

After including records corresponding to the pilots in the ACCESS_HO_LIST, records corresponding to the pilots having the highest pilot strength relative to other pilots in the OTHER_REPORTED_LIST shall be added to the list. As many pilots as possible from the OTHER_REPORTED_LIST shall be included in the list without the encapsulated PDU exceeding max_msg_size for the channel on which the PDU will be sent.

If the PDU corresponds to a Radio Environment Report Message, and RER_ENABLED is set to YES, the MS shall generate a new RER_PILOT_LIST, which is the set of pilots that includes the Active Set pilot and the min(MAX_RER_PILOT_LIST_SIZE$_s$, NUM_ADD_PILOTS+NUM_AUX_PILOTS) additional pilots with records included in the PDU that have the strongest pilot strength.

It should be understood that the present invention is applicable to significantly enhance third generation wireless systems such as, but not limited to, 1xEV-DO, 1xEV-DV, MC-DV and UMTS/HSDPA. 1xEV-DO has been standardized by the Telecommunication Industry Association as TIA/EIA/IS-856, "CDMA2000, High Rate Packet Data Air Interface Specification". 1xEV-DV provides integrated voice and simultaneous high-speed packet data multimedia services within CDMA2000 at speeds of up to 3.09 Mbps. Relatedly, MC-DV provides integrated multi-carrier voice and simultaneous high-speed packet data multimedia services within CDMA2000. UMTS/HSDPA is High Speed Downlink Packet Access (HSDPA) within the Universal Mobile Telephone System (UMTS). The present invention can easily update the location of a dormant MS and setup fast call, while reduce paging resource utilization in wireless access networks.

Although particular embodiments of the present invention have been described in detail, it should be appreciated that numerous variations, modifications, and adaptations may be made without departing from the scope of the present invention as defined in the claims.

What is claimed is:

1. A method for determining when a location update message is sent from a mobile station (MS) to a base transceiver station (BTS) when the MS is in a dormant state, the method comprising the steps of:

starting a first timer when the MS enters a dormant state;
starting a second timer when the first timer reaches a predefined value T1;
while the first timer is counting and prior to its reaching said predefined value T1, sending a layer 2 location update message whenever the MS performs an idle handoff indicating that the strongest pilot signal strength has changed from one sector to another sector,
while the second timer is counting and prior to its reaching a predefined value T2, sending a layer 2 location update message whenever a further criterion is met; and
after the second timer has reached said predefined value T2, sending no further layer 2 location update messages.

2. The method of claim 1, wherein said further criterion includes a time period.

3. The method of claim 1, wherein said further criterion includes the MS having traveled a predetermined distance since the previous location update message was sent.

4. The method of claim 1, wherein said further criterion includes counting a predefined number of idle handoffs.

5. The method of claim 1, further comprising predefining the starting value for the first timer to said predefined value T1.

6. The method of claim 1, further comprising predefining the starting value of the second timer to said predefined value T2.

7. The method of claim 4, further comprising predefining the starting value of the second timer to said predefined value T2.

8. The method of claim 1, wherein said layer 2 location update message includes identification of the two strongest pilot signals being received by the MS.

9. The method of claim 1, wherein the step of sending a layer 2 location update message while the first timer is counting includes the step of:

sending by the MS to the BTS a layer 2 location update message containing a message type and an MS identifier, whereby the network updating the location of the MS.

10. The method of claim 9, further comprising the step of:
in response to the layer 2 location update message from the MS, sending by the BTS to the MS a location update acknowledgement message containing a message type and an MS identifier.

11. The method of claim 1, further comprising the steps of:

sending by the MS in the dormant state to the BTS a reconnect message containing a message type and an MS identifier; and
sending by the BTS to the MS a channel assignment message, whereby the MS initiates an MS's dormant to active state transition.

12. The method of claim 1, further comprising the steps of:

sending by the MS to the BTS a layer 2 location update message containing a message type and an MS identifier;
sending by the BTS to the MS a location update acknowledgement message containing a message type and an MS identifier; and
sending by the BTS to the MS a message informing MS's active set,
wherein the BTS initiates an MS's dormant to active state transition.

13. The method of claim 1, further comprising the steps of:

sending by the MS to the BTS a layer 2 location update message containing a message type and an MS identifier;

sending by the BTS to the MS a location update acknowledgement message containing a message type and an MS identifier, sending by the BTS to the MS a message informing MS's active set;

sending by the BTS to the MS a data burst message; and sending by the MS to the BTS a data burst acknowledgement message containing a message type and an MS identifier.

14. A method for defining the region of a wireless network in which to page a dormant mobile station (MS) when the network determines that data is to be sent to that dormant MS, the method comprising the steps of:

starting a first timer when the MS enters a dormant state;

starting a second timer when the first timer reaches a predefined value T1;

while the first timer is counting and prior to its reaching said predefined value T1, sending an MS page to the sector indicated by the most recent layer 2 location update message received from the MS;

while the second timer is counting and prior to its reaching a predefined value T2, sending an MS page to the sectors surrounding the sector indicated in the most recently received layer 2 location update message consistent with the further criterion being used to trigger a location update messages being sent from the MS; and after the second timer has reached said predefined value T2, sending an MS page to all network sectors.

15. The method of claim 14, wherein said further criterion includes a time period.

16. The method of claim 14, wherein said further criterion includes the MS having traveled a predetermined distance since the previous location update message was sent.

17. The method of claim 14, further comprising predefining the starting value for the first timer to said predefined value T1.

18. The method of claim 14, further comprising predefining the starting value of the second timer to said predefined value T2.

19. The method of claim 17, further comprising predefining the starting value of the second timer to said predefined value T2.

20. The method of claim 14, wherein said further criterion includes counting a predefined number of idle handoffs.

21. A mobile station (MS) for communicating with a base transceiver station (BTS) and a base station controller (BSC) in wireless communication system, the MS in a dormant state sending a location update message, the MS comprising:

means for starting a first timer when the MS enters a dormant state;

means for starting a second timer when the first timer reaches a predefined value T1;

means for sending, while the first timer is counting and prior to its reaching said predefined value T1, a layer 2 location update message whenever the MS performs an idle handoff indicating that the strongest pilot signal strength has changed from one sector to another sector;

means for sending, while the second timer is counting and prior to its reaching a predefined value T2, a layer 2 location update message whenever a further criterion is met; and means for sending, after the second timer has reached said predefined value T2, no further layer 2 location update messages.

22. The MS of claim 21, further including means for predefining the starting value for the first timer to said predefined value T1.

23. The method of claim 21, further including means for predefining the starting value of the second timer to said predefined value T2.

24. The MS of claim 21, further including means for sending the BTS a layer 2 location update message containing a message type and an MS identifier, whereby the network updating the location of the MS.

25. A communication network comprising base station controllers (BSCs) and base transceiver stations (BTSs) that communicate with mobile stations (MSs) in wireless communication system, the network paging a dormant MS when the network determines that data is to be sent to that dormant MS, the MS comprising:

means for starting a first timer when the MS enters a dormant state;

means for starting a second timer when the first timer reaches a predefined value T1;

means for sending, while the first timer is counting and prior to its reaching said predefined value T1, a layer 2 location update message whenever the MS performs an idle handoff indicating that the strongest pilot signal strength has changed from one sector to another sector;

means for sending, while the second timer is counting and prior to its reaching a predefined value T2, a layer 2 location update message whenever a further criterion is met; and means for sending, after the second timer has reached said predefined value T2, no further layer 2 location update messages, wherein the BTS includes:

means for receiving the layer 2 location update message;

means for sending a location update acknowledgement message to the MS.

26. The communication network of claim 25, wherein:

the MS further includes means for sending the BTS a layer 2 location update message containing a message type and an MS identifier, whereby the network updating the location of the MS; and the BTS further include means for sending the MS a location update acknowledgment message containing a message type and an MS identifier.

27. The communication network of claim 25, wherein:

the MS in the dormant state includes means for sending the BTS a reconnect message containing a message type and an MS identifier; and the BTS includes the MS a channel assignment message, whereby the MS initiates an MS's dormant to active state transition.

28. The communication network of claim 25, wherein:

the MS includes means for sending the BTS a layer 2 location update message containing a message type and an MS identifier; and the BTS includes:

means for sending the MS a location update acknowledgement message containing a message type and an MS identifier; and means for sending the MS a message informing MS's active set, wherein the BTS initiates an MS's dormant to active state transition.

29. The communication network of claim 25, wherein:

the MS includes means for sending the BTS a layer 2 location update message containing a message type and an MS identifier; and the BTS includes:
  means for sending the MS a location update acknowledgement message containing a message type and an MS identifier; and
  means for sending the MS a message informing MS's active set; and
  means for sending the MS a data burst message,
  wherein the MS further includes means for sending the BTS a data burst acknowledgement message containing a message type and an MS identifier.

30. A method for updating locations of mobile stations (MSs) in a dormant state in a wireless communication network wherein a Base Station Controller controls various operating aspects of the network and a Base Transceiver Station provides communication links between MSs and between the MSs and a wireline telephone network, the method comprising the steps of:
  starting a timer when the MS enters a dormant state;
  while the timer is counting and prior to its reaching a predefined value T1, sending by the MS to the BTS, whenever the MS performs an idle handoff, a message containing information on the location of the MS, the information being associated with the sector of the MS, thereby the network updating the location of the dormant MS at the sector level;
  when the timer's count reaches the value T1, restarting the timer to count until it reaches a predetermined value T2;
  while the timer is counting and prior to its reaching the predefined value T2, sending by the MS to the BTS a message containing information on the location of the MS, the information being associated with the area of the MS, the area being greater than the sector, thereby the network updating the location of the dormant MS at the area level;
  when the timer's count reaches the value T2, sending no further message of location to the BTS.

31. The method of claim 30, further including the step of:
  after the timer's count reaches the value T2, sending an MS page to all network sectors.

32. The method of claim 30, wherein:
  the step of sending a message prior to T1 includes the step of sending a layer 2 message containing a message type and an MS identifier; and
  the step of sending a message prior to T2 includes the step of sending a layer 2 message containing a message type and an MS identifier.

* * * * *